United States Patent
Triandopoulos et al.

(10) Patent No.: US 9,929,860 B1
(45) Date of Patent: Mar. 27, 2018

(54) METHODS AND APPARATUS FOR GENERALIZED PASSWORD-BASED SECRET SHARING

(71) Applicant: EMC Corporation, Hopkinton, MA (US)

(72) Inventors: Nikolaos Triandopoulos, Arlington, MA (US); Yupeng Zhang, College Park, MD (US)

(73) Assignee: EMC Corporation, Hopkinton, MA (US)

( * ) Notice: Subject to any disclaimer, the term of this patent is extended or adjusted under 35 U.S.C. 154(b) by 88 days.

(21) Appl. No.: 14/984,352

(22) Filed: Dec. 30, 2015

(51) Int. Cl.
 *H04L 29/06* (2006.01)
 *H04L 9/08* (2006.01)
(52) U.S. Cl.
 CPC ............ *H04L 9/085* (2013.01); *H04L 9/0894* (2013.01)
(58) Field of Classification Search
 CPC ......... H04L 9/085; H04L 9/08; H04L 9/0861; H04L 63/083
 USPC ........................................................ 380/286
 See application file for complete search history.

(56) References Cited

U.S. PATENT DOCUMENTS

| | | | | |
|---|---|---|---|---|
| 6,788,788 | B1 * | 9/2004 | Kasahara | H04L 9/083 380/277 |
| 2002/0007457 | A1 * | 1/2002 | Neff | H04L 9/006 713/180 |
| 2007/0294183 | A1 * | 12/2007 | Camenisch | G06Q 20/06 705/65 |
| 2010/0008505 | A1 * | 1/2010 | Bai | H04L 9/085 380/255 |
| 2010/0054458 | A1 * | 3/2010 | Schneider | H04L 9/085 380/28 |
| 2012/0317034 | A1 * | 12/2012 | Guha | G07F 17/3251 705/65 |

OTHER PUBLICATIONS

Schultz, David Andrew. Mobile proactive secret sharing. Diss. Massachusetts Institute of Technology, 2007.*
Harn, Lein, and Changlu Lin. "Strong (n, t, n) verifiable secret sharing scheme." Information Sciences 180.16 (2010): 3059-3064.*

(Continued)

*Primary Examiner* — Syed Zaidi
(74) *Attorney, Agent, or Firm* — Ryan, Mason & Lewis, LLP

(57) ABSTRACT

Generalized password-based secret sharing schemes are provided. A secret sharing method comprises obtaining a secret; obtaining fixed values from one or more parties; setting an element of a column vector of a password-based linear secret sharing scheme based on the secret; randomly selecting values from a field for additional elements of the column vector; setting remaining elements of the column vector to values that ensure that a product of a matrix and the column vector, for each fixed-share party, is equal to the corresponding fixed value; and distributing non-fixed shares to additional parties using a labeling function. In another method, a defining matrix corresponds to the secret and a field of both the secret and a plurality of shares of the secret. A given share for each party in the set is set to the corresponding obtained fixed value. A row in the defining matrix is randomly selected such that an element in the row corresponding to each party in the set is equal to the corresponding obtained fixed value.

20 Claims, 6 Drawing Sheets

---

PASSWORD-BASED LINEAR SECRET SHARING PROCESS 150 (ONE OR MORE FIXED SHARES): GENERAL CASE

1. Fixed-Share collection: Obtain $m'$ fixed share(s) $\pi_i = \{\pi_{i,j} | \varphi(j)=i\}$ from $l_{m'}$ parties $P_i \in P_\pi$
2. Scheme Adaptation: Set first element of column vector $r_s$ to secret $s$ and select remaining elements $a_1, ..., a_{t-1}$ randomly and consistently to fixed-shares conditions
  ① Values Partition: Partition $a_1, ..., a_{t-1}$ into disjoint sets of $m'$ constrained $C$ and $t-m'-1$ free variables $F$
   • Linear System Solving: Solve system of linear equations defined by fixed-shares conditions
   $(M \cdot r_s)_j = \pi_{i,j}$ for all $i,j$ such that $\varphi(j)=i$ and $P_i \in P_\pi$
   • Parameterization: Form solution space by expressing each constrained variable $a_i \in C$, contained in a distinct equation of the system, as a linear combination of free variables and fixed shares
  ② Partial Randomization: Randomly select free variables $a_i \in F$
  ③ Fixed-Shares Constraining: Deterministically set constrained variables $a_i \in C$ based on randomly selected values in $F$ and obtained fixed shares $\{\pi_i | P_i \in P_\pi\}$
3. Share Distribution: Send non-fixed shares computed by $M \cdot r_s$ to all parties $P_i \notin P_\pi$ using labeling function $\varphi()$

(56) References Cited

OTHER PUBLICATIONS

Cramer, Ronald, Ivan Damgård, and Ueli Maurer. "General secure multi-party computation from any linear secret-sharing scheme." Advances in Cryptology—EUROCRYPT 2000. Springer Berlin/Heidelberg, 2000.*

Bai, Li, and XuKai Zou. "A proactive secret sharing scheme in matrix projection method." International Journal of Security and Networks 4.4 (2009): 201-209.*

* cited by examiner

*FIG. 1B*

PASSWORD-BASED LINEAR SECRET SHARING PROCESS 150 (ONE OR MORE FIXED SHARES): GENERAL CASE

1. Fixed-Share collection: Obtain $m'$ fixed share(s) $\pi_i = \{\pi_{i,j} | \varphi(j)=i\}$ from $l_m$, parties $P_i \in P_\pi$
2. Scheme Adaptation: Set first element of column vector $r_s$ to secret $s$ and select remaining elements $a_1, ..., a_{t-1}$ randomly and consistently to fixed-shares conditions
   - ① Values Partition: Partition $a_1, ..., a_{t-1}$ into disjoint sets of $m'$ constrained $C$ and $t-m'-1$ free variables $F$
   - Linear System Solving: Solve system of linear equations defined by fixed-shares conditions $(M \cdot r_s)_j = \pi_{i,j}$ for all $i,j$ such that $\varphi(j)=i$ and $P_i \in P_\pi$
     - Parameterization: Form solution space by expressing each constrained variable $a_i \in C$, contained in a distinct equation of the system, as a linear combination of free variables and fixed shares
   - ② Partial Randomization: Randomly select free variables $a_i \in F$
   - ③ Fixed-Shares Constraining: Deterministically set constrained variables $a_i \in C$ based on randomly selected values in $F$ and obtained fixed shares $\{\pi_i | P_i \in P_\pi\}$
3. Share Distribution: Send non-fixed shares computed by $M \cdot r_s$ to all parties $P_i \notin P_\pi$ using labeling function $\varphi()$

FIG. 2A

PASSWORD-BASED LINEAR SECRET SHARING PROCESS 200 (ONE OR MORE FIXED SHARES): INSTANTIATION TO PASSWORD-BASED THRESHOLD SHAMIR SECRET SHARING

1. Fixed-Share Collection:

Obtain $m'$ fixed share(s) $\pi_i = \{\pi_{i,j} | \varphi(j)=i\}$ from $l_m'$, parties $P_i \in P_\pi$

2. Partial Randomization:

Set first element of column vector $r_s$ to secret $s$ and randomly select elements $a_1, ..., a_{t-m'-1}$

3. Fixed-Shares Constraining:

Set elements $a_{t-m'}, ..., a_{t-1}$ such that $(M \cdot r_s)_j = \pi_{i,j}$ for all $i,j$ such that $\varphi(j)=i$ and $P_i \in P_\pi$

4. Share Distribution:

Distribute non-fixed shares computed by $M \cdot r_s$ to all parties $P_i \notin P_\pi$, using labeling function $\varphi()$ PASSWORD-BASED LINEAR SECRET SHARING PROCESS 250 (ONE OF MORE FIXED SHARES): INSTANTIATION TO MONOTONE SYMMETRIC BRANCHING PROGRAM SPECIFYING A CONCRETE ACCESS STRUCTURE

*FIG. 3*

PASSWORD-BASED SECRET SHARING PROCESS 300
BASED ON ORTHOGONAL ARRAYS (ONE OR MORE FIXED SHARES):

1. Obtain Defining Matrix $M$ for Threshold Secret Sharing Scheme with $n$ Parties Threshold $t$ and a Field of Both the Secret and the Shares 2. Obtain $m$ Fixed Share(s) from Parties in $P_\pi$ (where $m \geq 1$).

3. Fix Share $s_i$ for Party $P_i$ to be $\pi_i$ for all $l_i \in \{l_1, ..., l_m\}$ (i.e. Parties With Fixed Shares).

4. Randomly Select a Row $r$ in Defining Matrix $M$ from all Rows such that $M(r, l_i) = \pi_{l_i}$ for all $l_i \in \{l_1, ..., l_m\}$ (i.e., Parties With Fixed Shares).

5. Distribute Non-Fixed Shares from Selected Row $r$ to Corresponding Parties not in $P_\pi$.

METHODS AND APPARATUS FOR GENERALIZED PASSWORD-BASED SECRET SHARING

CROSS-REFERENCE TO RELATED APPLICATIONS

The present application is related to U.S. patent application Ser. No. 14/577,206, filed Dec. 19, 2014 (now U.S. Pat. No. 9,455,968, issued on Sep. 27, 2016), entitled "Protection of a Secret on a Mobile Device Using a Secret-Splitting Technique with a Fixed User Share;" and U.S. patent application Ser. No. 14/672,507, filed May 30, 2015 (now U.S. Pat. No. 9,813,243, issued on Nov. 7, 2017), entitled "Methods and Apparatus for Password-Based Secret Sharing Scheme," each incorporated by reference herein.

FIELD

The present invention relates to the protection of secret keys and other information in devices.

BACKGROUND

To strengthen the security of computer systems against network intrusions and server compromises, key splitting is often applied in order to split the secret state of the system (typically a key) into a number of (typically randomly chosen) "partial states," or shares, which are then dispersed into a number of devices. Then, an attacker's task is much harder: Leakage of the full secret state requires that the attacker gets access to a sufficiently large number of the shares.

Recently, U.S. patent application Ser. No. 14/672,507, filed May 30, 2015 (now U.S. Pat. No. 9,813,243, issued on Nov. 7, 2017), entitled "Methods and Apparatus for Password-Based Secret Sharing Scheme," incorporated by reference herein, disclosed password-based secret sharing (PBSS) for threshold and exclusive OR (XOR)-based secret sharing. The disclosed PBSS techniques allow for one or more of these shares to be fixed (e.g., to take predetermined values that are independent of the split key and not necessarily randomly chosen). PBSS, in particular, enables key splitting to employ a user's password or other personal secret information as a share into which the key is split, as described in the key-splitting framework disclosed in U.S. patent application Ser. No. 14/577,206, filed Dec. 19, 2014 (now U.S. Pat. No. 9,455,968, issued on Sep. 27, 2016), entitled "Protection of a Secret on a Mobile Device Using a Secret-Splitting Technique with a Fixed User Share," incorporated by reference herein.

Nonetheless, a need remains for password-based secret sharing schemes for richer classes of sharing schemes (beyond, for example, Shamir's threshold scheme or XOR-based secret sharing).

SUMMARY

Illustrative embodiments of the present invention provide methods and apparatus for generalized password-based secret sharing. In one embodiment, an exemplary secret sharing method comprises obtaining a secret; obtaining m fixed values from one or more parties, where m is greater than or equal to one; setting a first element of a column vector of a password-based linear secret sharing scheme having a size t to a value that depends on the secret; randomly selecting values from a field for t−m−1 additional elements of the column vector; setting remaining elements of the colunm vector to values that ensure that a product of an m-by-t matrix and the column vector, for each of the one or more parties, is equal to the fixed value of the corresponding party; and distributing non-fixed shares based on the product to additional parties using a labeling function.

In another embodiment, an exemplary secret sharing method comprises obtaining a secret; obtaining at least one fixed value from one or more parties in a set of parties; obtaining a defining matrix corresponding to the secret for a threshold secret sharing scheme with a threshold and a field of both the secret and a plurality of shares of the secret; setting a given share for each party in the set of parties to the corresponding obtained fixed value for all parties in the set of parties; randomly selecting a row in the defining matrix from all rows of the defining matrix such that an element in the row corresponding to each of the one or more parties in the set of parties is equal to the corresponding obtained fixed value; and distributing non-fixed shares from the elements of the selected row to corresponding parties not in the set of parties. The random row selection optionally further requires that an element in the row corresponding to the secret is equal to the secret.

In one or more embodiments, each fixed value comprises one or more of secret information related to the one or more parties; a password of the one or more parties; and a hash function applied to a password of the one or more parties.

In one or more embodiments, reconstruction of the secret can be based on a minimum number of shares that must be obtained in a predefined order to reconstruct the secret; or an access structure comprising one or more authorized sets of parties. The authorized sets of parties comprise an ordered set of parties that need to combine shares in a predefined order to reconstruct the secret.

Embodiments of the invention can be implemented in a wide variety of different devices and applications for the protection of key material or other protected material using password-based secret sharing schemes.

BRIEF DESCRIPTION OF THE DRAWINGS

FIG. 1B is a flow chart illustrating an exemplary implementation of a password-based linear secret sharing process;

FIG. 2A is a flow chart illustrating an exemplary implementation of a password-based linear secret sharing process as a password-based threshold Shamir's scheme;

FIG. 3 is a flow chart illustrating an exemplary implementation of a password-based secret sharing process based on orthogonal arrays;

DETAILED DESCRIPTION

Figure 1A:
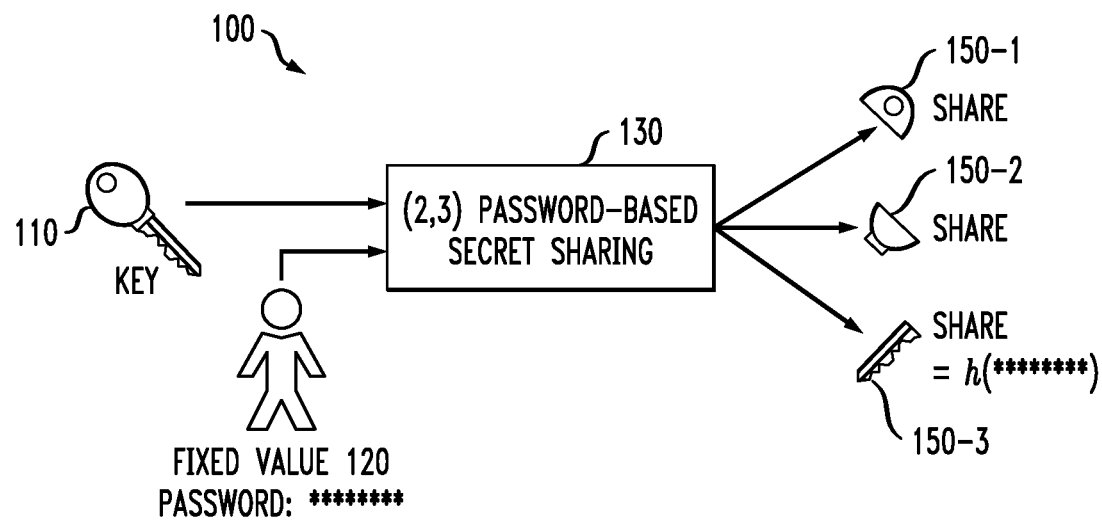
FIG. 1A illustrates a password-based threshold secret sharing scheme 100 that incorporates aspects of the invention.

Illustrative embodiments of the present invention will be described herein with reference to exemplary communication systems and associated servers, clients and other processing devices. It is to be appreciated, however, that the invention is not restricted to use with the particular illustrative system and device configurations shown.

Aspects of the invention provide a number of exemplary secret sharing schemes, collectively referred to herein as password-based secret sharing schemes. One or more embodiments of the invention recognize that fixed (e.g., password-based) shares can be substantially securely supported by two larger classes of secret sharing schemes, namely, linear secret sharing schemes (LSSS) and for threshold secret sharing schemes that are based on orthogonal arrays. That is, substantially any linear secret sharing scheme or substantially any threshold sharing scheme based on orthogonal arrays (where each constitutes a different, possibly larger, class of sharing schemes than Shamir's or XOR-based schemes), can be adapted in one or more embodiments to substantially securely allow support of fixed shares (e.g., can be extended to become a password-based linear secret sharing scheme or password-based orthogonal-array sharing scheme). See, for example, Adi Shamir, "How to Share a Secret," Commun. ACM, Vol. 22, No. 11, 612-613 (November 1979), incorporated by reference herein.

Secret Sharing Schemes

A secret sharing scheme is a pair of algorithms (Share, Rec) that allow the sharing of a secret Y into a number of shares, or sharing, $S=\{s_1,s_2,\ldots,s_{n'}\}$, which are distributed to a number of entities, or parties, $P=\{p_1,p_2,\ldots,p_{n'}\}$, $n'\leq n$, so that each party collectively receives at least one share, such that reconstruction of secret Y is allowed from at least one subset of shares, only under certain conditions on this subset being met. Such conditions on subsets of shares that allow secret reconstruction may depend on the subset size or generally on the exact members of the subset, i.e., on the exact combination of shares and, therefore, on a corresponding combination of parties. These conditions are typically expressed by an access structure (AS) that characterizes the exact subsets of shares, or corresponding subset of parties, that allow reconstruction of the secret for a given scheme. Any such subset in the access structure of a scheme is often called an authorized set of shares or parties. Then, a secret sharing scheme should necessarily limit secret reconstruction only to authorized sets in its access structure and disallow secret reconstruction from any subset of shares or parties not in its access structure.

Generally, a secret sharing scheme can support an arbitrary such set of conditions defined by the access structure AS containing authorized sets of parties that result from any set-operation formula over the parties in $P=\{p_1,p_2,\ldots,p_{n'}\}$. For example, $$AS=\{\{p_1\cup p_2\},\{(p_1\cup p_2\cup p_3)\cap(p_2\cup p_3\cup p_4)\}\}.$$

Often, for secret sharing to be more efficient and secret reconstruction conditions to be meaningful, the access structure should be expressed by a monotone formula, so that, for example, if subset $\{p_2,p_3\}$ is included in AS, then all proper supersets of it are also included.

Generic Schemes

Generic secret sharing schemes for general monotone access structures are known to exist. See, for example, J. Benaloh and J. Leichter, "Generalized Secret Sharing and Monotone Functions," Proc. on Advances in Cryptology, CRYPTO '88, pages 27-35 (1990); M. Ito et al., "Multiple Assignment Scheme for Sharing Secret," J. of Cryptology, Vol. 6, No. 1, 15-20 (1993); and/or M. Ito et al., "Secret Sharing Schemes Realizing General Access Structure," Proc. of the IEEE Global Telecommunication Conference, Globecom 1987, pages 99-102 (1987).

For example, the two referenced schemes by M. Ito et al. support a general monotone access structure AS by separately masking the shared secret Y for each authorized set $A_i \in AS$ as follows: One or more "mask" shares $R_{i,j}$, one for all but one of the parties in the authorized set $A_i=\{p_{i_1}, p_{i_2}, \ldots, p_{i_\Lambda}\}$, $\Lambda \geq 2$, are randomly and independently selected and exclusive Or-ed (XORed) with Y, through an XOR operation denoted herein by $\oplus$, consistently with the reconstruction constraint $Y=\oplus_{1\leq j\leq \Lambda} R_{i,j}$. In essence, for each authorized set $A_i$ of size $\Lambda$, the secret Y is split, using an additive sharing scheme, into $\Lambda$ shares, called additive shares, that are related to Y through XORing (or generally an addition operation, defined in the appropriate group and denoted herein also by $\oplus$), where all $\Lambda$ shares are needed for reconstruction. Then, party $p_k \in P$, $k \in [1:n']$, is provided with one such additive share for each authorized set $A_i$ that $p_k$ belongs to, that is, with the following set:

$$S_k=\{R_{i,\Phi(k,i)} \mid A_i \in AS, p_k \in A_i\},$$

where function $\Phi(k,i)$ returns the rank of $p_k \in A_i$ in set $A_i=\{p_{i_1},p_{i_2},\ldots,p_{i_\Lambda}\}$ (according to a fixed total ordering among parties), defined as $\Phi(k,i)=j$ if $A_i=\{p_{i_1},p_{i_2},\ldots,p_{i_\Lambda}\}$ and $p_k=p_{i_j}$, $1\leq j\leq \Lambda$, or $\Phi(k,i)=0$ otherwise.

Existing generic schemes of the above design paradigm are both ideal (that is, each share has a size that is exactly the size of the secret) and perfectly private (that is, any unauthorized set learns nothing about the secret in an information-theoretic sense).

Similarly, the above-referenced scheme by Benaloh and Leichter recursively applies additive secret sharing to a collection of elementary access structures (or authorized sets) and a collection of secondary access structures (or authorized sets) defined as the intersection of elementary access structures, with the overall goal of removing redundancies among the elementary access structures and, thus, reducing the total number of shares used in the scheme.. For example, a secret Y can be shared to secondary authorized set $A_1 \wedge A_2$ defined over elementary sets $A_1=\{p_1,p_2,p_3\}$ and $A_2=\{p_2,p_3,p_4\}$ by first choosing randomly and independently secrets $Y_1$ and $Y_2$ such that $Y=Y_1 \oplus Y_2$ (or $Y=Y_1+Y_2$ mod m if secrets come from the domain $0,1,\ldots,m-1$) and then additively sharing $Y_1$ and $Y_2$ to sets $\{p_1,p_2,p_3\}$ and $\{p_2,p_3,p_4\}$ respectively. Then, only members of $A_1 \wedge A_2$ can reconstruct "sub-secrets" $Y_1$ and $Y_2$, both of which are needed for the reconstruction of secret Y, and such recursive scheme can generally lead to efficiency improvements compared to the "flat" generic scheme discussed above [6,5].

Threshold Schemes

Threshold secret sharing schemes, on the other hand, are special schemes with corresponding access structures where reconstruction depends only on the number of available parties (or combined shares), namely, by including only authorized sets of size at least a given threshold value. Specifically, in a typical (t,n) or t-out-of-n secret sharing scheme, $2\leq t\leq n$, the secret is split into n shares where each party $p_i$ is provided with exactly one share $s_i$, and secret reconstruction is allowed by any set of parties (equivalently, set of shares) of size t or more, that is, any set reaching a size of the reconstruction threshold value t.

Shamir's secret sharing scheme is the most widely used threshold scheme and is based on polynomials. For a description of Shamir's secret sharing scheme, see, for example, Adi Shamir, "How to Share a Secret," Commun. ACM, Vol. 22, No. 11, 612-613 (November 1979), incorporated by reference herein.

Under Shamir's secret sharing scheme, given a secret Y in the appropriate range, a random polynomial $f(\cdot)$ of degree $t-1$ is chosen by selecting randomly and independently $t-1$ polynomial coefficients so that $f(0)=Y$, where arithmetic modulo a (large) prime of an appropriate length is used to evaluate the polynomial, and the produced sharing takes the form $S=\{s_i=(i,f(i)) \mid i \in [1:n]\}$. Then, secret reconstruction is allowed through polynomial interpolation (and evaluation of $f(0)$) for any subset of shares of size at least t, based on the fact that any k points uniquely define a polynomial of degree (at most) $k-1$ passing through all these points. Shamir's scheme is both ideal (that is, each share is the size of the secret) and perfectly private (that is, any unauthorized set of at most $t-1$ shares learns nothing about the secret in an information-theoretic sense).

The XOR-based additive secret sharing scheme discussed above is essentially a (n,n) or n-out-of-n threshold scheme.

Overview of Disclosed Sharing Schemes

As noted above, aspects of the invention provide a number of secret sharing schemes, collectively referred to herein as generalized password-based secret sharing schemes. In various embodiments of the invention, the exemplary generalized password-based secret sharing schemes achieve the property of substantially securely supporting selection of predetermined fixed shares. A predetermined fixed share is associated with a predetermined fixed value, such as a user's password.

FIG. 1A illustrates an exemplary password-based secret sharing (PBSS) technique 100, in which aspects of the present invention can be employed. Generally, the PBSS scheme allows the substantially secure selection of one or more shares, referred to as fixed shares, in accordance with a set of corresponding predetermined fixed values, which are provided as additional inputs to the secret sharing algorithm.

As shown in FIG. 1A, a key 110 (or other secret information) and one or more fixed values 120, such as a user password, are applied to a password-based secret sharing scheme 130, such as. a (2, 3) scheme. The exemplary (2, 3) scheme splits the exemplary key 110 into three shares. In the embodiment of FIG. 1A, the key 110 is split into two non-fixed shares 150-1 and 150-2, and one fixed share 150-3, sometimes referred to as a password share. The password share 150-3 is obtained, for example, by applying a hash function, h, to the user password 120. The password share 150-3 is typically not explicitly stored.

Notation $\Gamma$ is used to denote the access structure, which is the set of qualified sets for a secret sharing scheme S.

Linear Secret Sharing Schemes (LSSS)

Shamir's Secret Sharing Scheme:

Secret sharing was first proposed by Shamir. See, e.g., A. Shamir, "How to Share a Secret," Communications of the Association of Computer Machinery, Vol. 22, No. 11, 612-13 (1979). The model is that a trusted dealer has a secret and wants to distribute one share of the secret to each party so that any adversary with up to $t-1$ shares can gain no information about the secret, while anyone with t shares can reconstruct the secret. Shamir's scheme works as follows.

The secret w lies in a finite field $\mathbb{Z}_q$, where q is a large prime. The dealer randomly chooses $a_1, a_2, \ldots, a_{t-1} \in \mathbb{Z}_q$ to define a polynomial $f(\cdot)$ of degree $t-1$ with $f(x)=w+a_1x+a_2x^2+\ldots+a_{t-1}x^{t-1}$, and privately delivers to party $P_i \in \{P_1, P_2, \ldots, P_n\}$ the share $s_i=(i,f(i))$. Then, t (or more) shares suffice to reconstruct the polynomial $f$ by Lagrange interpolation and thus, the secret $w=f(0)$; but any $t-1$ shares are fully and equi-probably consistent with any possible value $w' \in \mathbb{Z}_q$ of the secret, thus, any $t-1$ or less shares leak substantially no information about the secret.

Linear Secret Sharing Schemes as Generalization of Shamir's Scheme:

Shamir's Scheme can be viewed as computing each share $s_i$ as the i th element (row) $y_i$ of vector $y=Nx$, where x is the vector $(w\ a_1 \ldots a_{t-1})^T$ and N is a n×t matrix whose i th row is $(1\ i\ \ldots\ i^{t-1})$. In Shamir's scheme, each row corresponds to the shares of a party, although, as discussed below, multiple rows can be assigned to a given party. In particular, a linear secret sharing scheme (LSSS) for sharing a secret w to n parties $P_i$, can be viewed as the generalization of Shamir's Scheme (e.g., as described in R. Cramer et al., "Secure Multiparty Computation and Secret Sharing," Cambrigde University Press (2015)). The generalization of Shamir's Scheme is defined by an m×t matrix M, where $m \geq n$, and also $m > t$ without loss of generality, and a labeling function $\Phi: \{1, \ldots, m\} \to \{1, \ldots, n\}$ that assigns rows to parties, such that party $P_{\Phi(i)}$ owns the i th row of M and the i th share (thus, a party may receive more than one share). For a subset A of the parties, let $M_A$ be the matrix consisting of the rows owned by parties in A. To share a secret $s \in \mathbb{F}$, where $\mathbb{F}$ is an appropriate finite field, a column vector $r_s$ is constructed that contains s as its first element and $t-1$ other elements $a_1, \ldots, a_{t-1}$ randomly chosen in $\mathbb{F}$, and the vector of shares $Mr_s$ is computed and distributed by privately delivering share $(Mr_s)_i$ to party $P_{\Phi(i)}$. Here, $Mr_s$ is a column vector of size m, that is, m numbers in one column, which correspond to the shares of the secret that are distributed amongst the n parties.

As described in R. Cramer et al., "Secure Multiparty Computation and Secret Sharing," Cambrigde University Press (2015), a linear secret sharing scheme S with n parties over a field z,901 can be defined by a matrix M. M has $m \geq n$ rows and t columns, and there is a labeling function $\Phi: \{1, \ldots, m\} \to \{1, \ldots, n\}$ such that party $P_{\Phi(i)}$ owns the i th row of M and the i th share. For a subset A of the parties, let $M_A$ be the matrix consisting of the rows owned by parties in A.

To share a secret $s \in \mathbb{F}$, a column vector $r_i$ is constructed such that the first element is s, and the other elements $a_1, \ldots, a_{t-1}$ are randomly chosen in $\mathbb{F}$. Finally the vector of shares $Mr_s$ is computed and distributed by giving $(Mr_s)_i$ to party $P_{\Phi(i)}$.

A linear secret sharing scheme is considered substantially secure for an access structure $\Gamma$, as long as the matrix M satisfies the following properties: (1) (Correctness) for all qualified subsets $A \in \Gamma$, it holds that the vector $e=(1,0,\ldots,0)^T$ is in the row space of $M_A$, i.e., $e=(1,0,\ldots,0)^T \in \text{Im}(M_A^T)$; and (2) (Privacy) for all unqualified subsets $A \notin \Gamma$, it holds that $e \notin \text{Im}(M_A^T)$. Therefore, in one or more embodiments, shares owned by A give no information about the secret.

Note that, for any matrix M, $\ker(M)^\perp = \text{Im}(M^T)$. For any vector e, $e \notin \text{Im}(M^T)$ if and only if there exists $w \in \ker(M)$ and $w^T \cdot e \neq 0$.

Note also that, indeed, Shamir's secret sharing scheme is an example of an LSSS scheme by setting the i th row of M as for $i^0, i^1, \ldots, i^{t-1}$ for $i=1,2,\ldots,n$, where t is the reconstruction threshold.

Defining Matrices and Orthogonal Arrays

Defining Matrix:

As described in E. F. Brickell and D. M. Davenport, "On the Classification of Ideal Secret Sharing Schemes," J. of Cryptology, Vol. 4, No. 2, pages 123-134 (1991), a secret sharing scheme. S over a secret field $\mathbb{K}$ and a share field $\mathbb{S}$ can be defined by a matrix M. M has m rows and n+1 columns. The first column stores values for the secret from field $\mathbb{K}$ and the other columns store values for shares. M is public. To share a secret (randomly chosen), one row $M_r = (M(r,0), M(r,1), \ldots, M(r,n))$ is randomly chosen from M, where $M(i,j)$ denotes the element in row i and column j of M. $M(r,0)$ is the secret, and $M(r,i)$ is the share for party $P_i$ for $i=1,\ldots,n$. The shares are distributed to parties through private channels and each party only holds one share.

M is called the defining matrix of S. In order for a secret sharing scheme to be correct and secure, M should have the following properties:
(a) For all qualified subsets, e.g. $\forall A \in \Gamma$, if $M(i,j)=M(i',j)$ for every $P_j \in A$, then $M(i,0)=M(i',0)$.
(b) For all unqualified subsets, e.g. $\forall A \in \Gamma$, let $A = \{P_{I_1}, \ldots, P_{I_j}\}$, for any share values $s_{I_1}, \ldots, s_{I_j} \in \mathbb{S}$, and any secret $s \in \mathbb{K}$, $|\{i : M(i, I_j) = s_{I_j} \text{ for all } P_{I_j} \in A\} \text{ and } M(i,0)=s\}|$ is independent to the choice of $s$.

Intuitively, given shares from a subset A, iterate over all rows of M to find those rows that have the same value of these shares at the corresponding columns. Property (a) guarantees that if A is a qualified set, all matching rows have the same first element, which is the secret. Property (b) guarantees that if A is an unqualified set, among those matching rows, every possible value of the secret appears exactly the same number of times, thus, no information of the secret can be learned. The detailed proof of the equivalence of Properties (a) and (b) and the security of the secret sharing scheme can be found in E. F. Brickell and D. M. Davenport, referenced above.

Defining Orthogonal Arrays:

An orthogonal array is a matrix whose elements x come from a set B of size b. M has n columns and the following parameters: the strength t and the index $\lambda$. The property of an orthogonal array is that for every selection of t out of n columns, every vector $[x_1, \ldots, x_t] \in B^t$ appears $\lambda$ times in all rows restricted to these t columns. It is not hard to see that with this property, the number of rows is $\lambda b^t$. $OA(\lambda b^t, n, b, t)$ denotes an orthogonal array.

An example of OA(4,3,2,2) is shown below:

| | | |
|---|---|---|
| 1 | 1 | 1 |
| 2 | 2 | 1 |
| 1 | 2 | 2 |
| 2 | 1 | 2 |

As proposed in J. Pieprzyk and X. M. Zhang, "Ideal Threshold Schemes from Orthogonal Arrays," Information and Communications Security, pages 469-479 (Springer, 2002), a threshold secret sharing scheme can be constructed using an orthogonal array as the defining matrix. For a threshold secret sharing scheme with n parties, threshold t and the field of both the secret and the shares $\mathbb{Z}_q$, its defining matrix is constructed as $M=OA(q^t, n+1, q, t)$.

Thus, the defining matrix $M=OA(q^t, n+1, q, t)$ satisfies Properties (a) and (b) of a defining matrix for a threshold secret sharing scheme with n parties, threshold t and the field of both the secret and the shares $\mathbb{Z}_q$.

Shamir's Secret Sharing is an example, by setting the orthogonal array as follows: for each column $i=0,1,\ldots,n$, a vector $\beta_i = [1, i^1, \ldots, i^{t-1}]$ is constructed. For every instance of the vector $x = [x_1, \ldots, x_t] \in \mathbb{Z}_q^t$, the inner product $\beta_i \cdot x$ is computed as one element of the column in order. In this way, the matrix is an orthogonal array $OA(q^t, n+1, q, t)$.

GENERALIZED PASSWORD-BASED SECRET SHARING SCHEMES

As noted above, one or more exemplary embodiments of the invention allow fixed (or password) shares to be substantially securely supported by two larger classes of secret sharing schemes, namely, for all linear secret sharing schemes (LSSS) and all threshold secret sharing schemes that are based on orthogonal arrays. That is, any linear secret sharing scheme or any threshold sharing scheme based on orthogonal arrays (where each constitutes a different, possibly larger, class of sharing schemes than Shamir's or XOR-based schemes), can be adapted to substantially securely allow support of fixed shares (e.g., can be extended to be become a password-based linear secret sharing scheme or password-based orthogonal-array sharing scheme).

Without loss of generality, one or more embodiments assume that whenever the predetermined value that is selected independently of the shared secret as a party's fixed share corresponds to this party's password, then this password is selected to be a strong password. That is, if a party selects its fixed share to be a password $\pi$, then it holds that for any unbounded power algorithm Adv, $Pr[\text{Adv}(\pi_i)=1] - Pr[\text{Adv}(\pi_j)=1] = 0$, for any two values of password $\pi_i, \pi_j$.

Password-Based Linear Secret Sharing Schemes

A linear secret sharing scheme S with random shares is defined by a matrix M with properties described in the sub-section entitled "Linear Secret Sharing Schemes as Generalization of Shamir's Scheme." Extensions of scheme S are considered that can support one or more fixed shares. It is noted that wherever a fixed share corresponds to a password selected by a party (i.e., a user), then the value of this fixed share can be obtained, for example, by applying an appropriate compressed-range hash function, such as a cryptographic collision-resistant hash function h or an appropriate key derivation function, to the selected password.

First consider the case where only one share of party $P_{\varphi(1)}$ is selected to be a fixed share that takes the value $s_1 = \pi$. In this case, this modification (that is, selecting $s_1$ to be a fixed share) means that the matrix M does not change, but to share a secret, the column vector $r_s$ is constructed such that $(M \cdot r_s)_1 = \pi$. The first element $a_0$ of $r_s$ is accordingly set to be the secret s and the remaining elements $a_1, a_2, \ldots, a_{t-2}, a_{t-1}$ are randomly selected consistent with the fixed-share. condition $(M \cdot r_s)_1 = \pi$. In particular, the linear equation resulting from condition $(M \cdot r_s)_1 = \pi$ can be solved with respect to one undetermined variable $a_i$ that appears in this equation, and all other undetermined values $a_j$ are set, where j is not i, by independently choosing random elements from the domain $\mathbb{F}$. S' denotes the modified scheme.

The above method can be further generalized to support more than one fixed shares, in particular a number of shares that is up to a preset known upper bound, as would be apparent to a person of ordinary skill in the art.

In particular, as described in the section entitled "Linear Secret Sharing Scheme (LSSS)," a party can have multiple shares, therefore, for each party $P_i$, its shares are defined as $S_i = \{S_{i,j}, \forall j : \Phi(j) = i\}$. Let $P_\pi = \{P_{l_1}, \ldots, P_{l_m}\}$ be the set of parties with fixed shares. One or more embodiments require that all shares in $S_i$ for party $P_i \in P_\pi$ are fixed, which is inherited from the definition of LSSS schemes. In this case, $$m' = \sum_{i=l_1}^{l_m} |S_i|$$

is the total number of fixed shares.

However, as apparent to one of ordinary skill in the art, this requirement is not necessary, and the generalized method can also support the case where, not all, but at least one share in $S_i$ for party $P_i \in P_\pi$ is fixed.

For a linear secret sharing scheme S defined by an matrix M, the number m' of fixed shares is bounded by m'≤t−2. To extend the linear secret sharing scheme S to support fixed shares, upon obtaining all fixed shares $S_{i,j} = \pi_{i,j}$ for all i,j such that $i = \Phi(j)$ and $P_i \in P_\pi$, the dealer sets the first element of vector $r_s$ as the secret s and then sets the remaining t−1 elements $a_1, \ldots, a_{t-1}$ of vector $r_s$:(1) randomly; and (2) consistently with the fixed-shares conditions $$(M \cdot r_k)_j = S_{i,j} = \pi_{i,j} \text{ for all } i = \Phi(j) : P_i \in P_\pi.$$

Generally, there are a. number of ways to realize the above two goals that follow the following general pattern.
1. The undetermined t−1 elements $a_1, \ldots, a_{t-1}$ of vector $r_s$ are partitioned into two disjoint sets:
   a set $C = \{a_{c_1}, \ldots, a_{c_{m'}}\}$ of constrained variables of size m'; and
   a set $F = \{a_{f_1}, \ldots, a_{f_{t-m'-1}}\}$ of free variables of size t−m'−1, so that $C \cap F = \emptyset$; and
2. the free variables in F are independently set to a random value in the domain $\mathbb{F}$;
whereas:
3. the constrained variables in C are deterministically set based on the randomly set free variables in F and the obtained fixed shares $\pi_{i,j}$, $i = \Phi(j)$, from all parties $P_i \in P_\pi$, according to the fixed-shares conditions.

The above general pattern can be implemented by considering the linear system of equations defined by the following fixed-shares conditions:

$$(M \cdot r_k)_j = S_{i,j} = \pi_{i,j} \text{ for all } i = \Phi(j) : P_i \in P_\pi,$$

and solving this system with respect to variables $a_1, \ldots, a_{t-1}$ to finally get a randomized solution. Specifically, the disclosed method operates as follows. The above linear system of equations has t−1 unknown (undetermined) variables and only m'≤t−2<t−1 constraints (equations). These constraints can be linearly independent of each other, generally due to the structure of matrix M, for example, in relation to the correctness and privacy conditions satisfied by the LSSS scheme in consideration. In any case, since there are more unknown variables than equations, the system admits a large number of solutions, effectively as large as the size of the domain (field) $\mathbb{F}$. Therefore, it is possible to express the solution space as m' constraints that restrict m' of the t−1 unknown (undetermined) variables and that are parameterized by the remaining t−m'−1 variables. This can be done by solving the system of equations with respect to m' constrained variables $C = \{a_{c_1}, \ldots, a_{c_{m'}}\}$, so that each variable $a_{c_i}$, 1≤i≤m', appears in the i-th equation and is expressed as a linear combination of the m' fixed shares and the t−m'−1 remaining, free, variables $F = \{a_{f_1}, \ldots, a_{f_{t-m'-1}}\}$, where $C \cap F = \emptyset$. Then, the computation of the column vector $r_s$ can be completed by independently setting each such free variable $a_{f_i} \in F$, 1≤i≤t−m'−1, to a random value from the domain $\mathbb{F}$, and then computing each constrained variable $a_{c_i}$, 1≤i≤m', using the randomly chosen free variables C and the fixed shares $S_{i,j}$ such that $i = \Phi(j)$ and $P_i \in P_\pi$. Finally, the secret sharing process is completed by the dealer, by computing the non-fixed shares in a similar manner as the share computation in standard linear secret sharing: Namely, using the labeling function $\Phi(\cdot)$, the dealer distributes non-fixed shares computed by $M \cdot r_k$ to all parties $P \notin P_\pi$. Note that as M'≤t−2, there is at least on randomly chosen coefficient $a_i e$, that is, the set F of free, and randomly chosen, variables is not empty, which guarantees that all non-fixed shares are uniformly distributed, as in the case of Shamir's secret sharing (with or without fixed shares). S' denotes the extended scheme above.

Note that in the extended scheme S', the determination of the set $P_\pi$ of parties with fixed shares as well as of the values that these fixed shares will take can be performed either individually by the involved parties or by the dealer itself. The only difference is that if the values of the fixed shares is determined by the defiler, then the dealer must distribute also these fixed shares to the parties in $P_\pi$ (in the other case, no distribution of fixed shares is needed as parties in $P_\pi$ already know the values they chose as fixed shares).

S' denotes the extended scheme above. The secret sharing scheme S' is substantially secure.

FIG. 1B is a flow chart illustrating an exemplary implementation of a password-based linear secret sharing process 150 for one or more fixed shares. As shown in FIG. 1B, the exemplary password-based linear secret sharing process 150 comprises the following steps:
1. Fixed-Share Collection: Obtain m' fixed share(s) $\pi_i = \{\pi_{i,j} \mid \varphi(j) = i\}$ from $l_{m'}$ parties $P_i \in P_\pi$.
2. Scheme Adaptation: Set first element of column vector $r_s$ to secret s and select remaining elements $a_1, \ldots, a_{t-1}$ randomly and consistently to fixed-shares conditions.
   1. Values Partition: Partition variables $a_1, \ldots, a_{t-1}$ into disjoint sets C and F, where C is a set of m' constrained variables and F is a set of t−m'−1 free variables.
      Linear System Solving: Solve system of linear equations defined by fixed-shares conditions: $(M \cdot r_s)_j = \pi_{i,j}$ for all i,j such that $\varphi(j) = i$ and $P_i \in P_\pi$.
      Parameterization: Form solution space by expressing each constrained variable $a_i \in C$, contained in a distinct equation of the system, as a linear combination of free variables and fixed shares.
   2. Partial Randomization: Randomly select free variables $a_i \in F$.
   3. Fixed-Shares Constraining: Deterministically set constrained variables $a_i \in C$ based on randomly selected values in F and obtained fixed shares $\{\pi_i \mid P_i \in P_\pi\}$.
3. Share Distribution: Distribute non-fixed shares computed by $M \cdot r_s$ to all parties not in $P_\pi$, using the labeling function $\varphi()$.

Example Password-Based Linear Secret Sharing Schemes

As noted above, Shamir's secret sharing scheme is an example of an LSSS by setting the i th row of M as $i^0$, $i^1, \ldots, i^{t-1}$ for $i=1,2, \ldots, n$, where t is the reconstruction threshold. This special structure of the matrix M allows simplification of the above general method as follows. Upon receiving all fixed shares, the dealer sets the first element $a_0$ of vector $r_k$ as the secret k and randomly selects $a_1, \ldots, a_{t-m'-1}$ from the field. Then, the dealer sets $a_{t-m'}, \ldots, a_{t-1}$ such that the following conditions are satisfied by solving with respect to the undetermined variables $a_{t-m'}, \ldots, a_{t-1}$ a system of linear equations: $(M \cdot r_k)_j = S_{i,j}$ for all $i=\Phi(j):P_1 \in P_\pi$. This system of equations corresponds to a linear system defined by a Vandermonde matrix, thus it permits unique solution because there are m' variables with m' independent linear constrains. The dealer then distributes non-fixed shares computed by $M \cdot r_k$ to all $P \in P_\pi$. Note that as $m' \leq t-2$, there is at least one randomly chosen coefficient $a_1$, which substantially guarantees that all non-fixed shares are uniformly distributed, as in the case of standard Shamir's secret sharing scheme. Therefore, the disclosed password-based LSSS construction subsumes the password-based threshold Shamir's scheme described in the U.S. patent application Ser. No. 14/672,507, filed May 30, 2015 (now U.S. Pat. No. 9,813,243, issued on Nov. 7, 2017), entitled "Methods and Apparatus for Password-Based Secret Sharing Scheme."

FIG. 2A is a flow chart illustrating an exemplary implementation of a password-based linear secret sharing process 200 for one or more fixed shares as an instantiation of a password-based threshold Shamir's scheme. As shown in FIG. 2A, the exemplary password-based linear secret sharing process 200 comprises the following steps:

1. Fixed-Share Collection: Obtain m' fixed share(s) $\pi_i = \{\pi_{i,j} \mid \varphi(j)=i\}$ from $1_{m'}$ parties $P_i \in P_\pi$.
2. Partial Randomization: Set first element of column vector $r_s$ as secrets s and randomly select elements $a_1, \ldots, a_{t-m'-1}$.
3. Fixed-Shares Constraining: Set elements $a_{t-m'}, \ldots, a_{t-1}$ such that $(M \cdot r_k)_j = S_{i,j} = \pi_{i,j}$ for all $i=\Phi(j):P_i \in P_\pi$ (i.e., for all shares of all parties with fixed shares).
4. Share Distribution: Distribute non-fixed shares computed by $M \cdot r_s$ to all parties not in $P_\pi$, using the labeling function $\varphi()$.

Consider another example of the previously presented password-based linear secret sharing scheme. LSSS schemes are known to encompass a class of secret sharing schemes that realize any access structure defined by a monotone symmetric branching program. See, for example, A. Beimel, Secure Schemes for Secret Sharing and Key Distribution, Dept. of Computer Science, Technion, Ph.D. Thesis, 1996.

Specifically, a monotone symmetric branching program is defined as a tuple $\Pi=(H,\rho,v_0,v_1)$ as follows:
H=(V,E) is an undirected graph with vertices (nodes) V and edges E;
$\rho:E \to \{x_1, \ldots, x_n\}$ is a labeling of the edges by variables; and $v_0$ and $v_1$ are two special nodes of the graph.

Let $x=x_1, \ldots, x_n \in \{0,1\}^n$ is an n-bit binary string that specifies the labels of edges in E, where edge, labeled by $x_i$, is set (by x) if and only if $x_i=1$. Then, program $\Pi=(H,\rho,v_0v_1)$ accepts x if in the sub-graph $H_x=(V,E_x)$, defined over by the same nodes of H, but only those edges in E that are set by x, there exists a path from $v_0$ to $v_1$.

Then, a large class of access structures over parties $P_1, \ldots, P_n$ can be defined by some program $\Pi=(H,\rho,v_0,v_1)$, H=(V,E), of the above type. Indeed, a specific program $\Pi$ induces a specific access structure $AS_\Pi$ over parties $P_1, \ldots, P_n$ as follows: a set A of parties belongs in $AS_\Pi$ if and only if its characteristic vector x(A) is accepted by $\Pi$, where the characteristic vector of a set $A \subseteq \{A_1, \ldots, A_n\}$ is the n-bit binary string x(A) having the bit $x(A)_i$ of position i set to 1 if and only if $P_i \in A$. In other words, a set A is authorized if and only if the edges in E that are. labeled by the parties in A form (at least one) path from $v_0$ to $v_1$.

As described by Beimel, referenced above, any access structure $AS_\Pi$ defined by a monotone symmetric branching program $\Pi=(H,\rho,v_0,v_1)$, H=(V,E), with $|E|=m$ edges and $|V|=t$ nodes, can be realized by the following linear secret sharing scheme, which uses in total m shares. Let z,901 be the domain of secrets, let $s \in \mathbb{F}$ be the secret to be shared, let $a_2, \ldots, a_t$ be elements that are randomly and independently of each selected from $\mathbb{F}$, and finally set $a_0=s$ and $a_1=0$. Also, let every edge $(v_i, v_j) \in E$, $i \leq j$ be assigned with the value $a_j - a_i$. To share s, then, the shares that each party $P_i$ gets from the dealer are the values that are assigned to the edges that are labeled by $x_i$ via the $\rho$ labeling. To reconstruct the secret, parties of an authorized coalition simply add or subtract their shares along a (previously known) $v_0$ -to- $v_1$ path, that is, they add together only those shares (from the union of their individually possessed shares) that correspond to edges in a $v_0$ -to- $v_1$ path, where each added share is weighted by a +1 or −1 weight. It is easy to see that by doing so, the parties in an authorized set end up with learning secrets s: In this summation of shares along the path, the edge connecting to $v_0$ contributes s, the edge connecting to $v_1$ contributes a zero, and all edges collectively contribute zero or two (or an even number of) occurrences of random elements $a_i$, $2 \leq i \leq t$, each time with alternating signs $a_i$, $-a_i$, so that all such occurrences cancel out to zero. On the other hand, by not containing at least one cut in graph H, any unauthorized set of parties cannot by definition form such a $v_0$ -to- $v_1$ path that would cancel the random elements $a_i$ that are contained in their shares, and therefore they cannot learn the secret s.

The above secret sharing scheme is clearly an LSSS because both the share generation and the secret recovery functions are linear. The above scheme can be cast in the form of an m×t matrix M: The i-th column corresponds to vertex (node) $v_i$ and each row corresponds to an edge $(v_i, v_j) \in E$, $i \leq j$, containing a 1 in the $v_j$ position (column), a −1 in the $v_i$ position (column) and zeros in all other positions. Then, indeed, for a column vector $r_s$ that consists of elements $s, 0, a_2, \ldots, a_t$, the share $(Mr_s)_k$, $1 \leq k \leq m$, that is given to party $P_{\varphi(k)}$ is a value of the form $a_j - a_i$ that is assigned to the k-th edge $(v_i, v_j)$, where the labeling function $\Phi$ is essentially defined by the labeling function $\rho$.

Figure 2B:
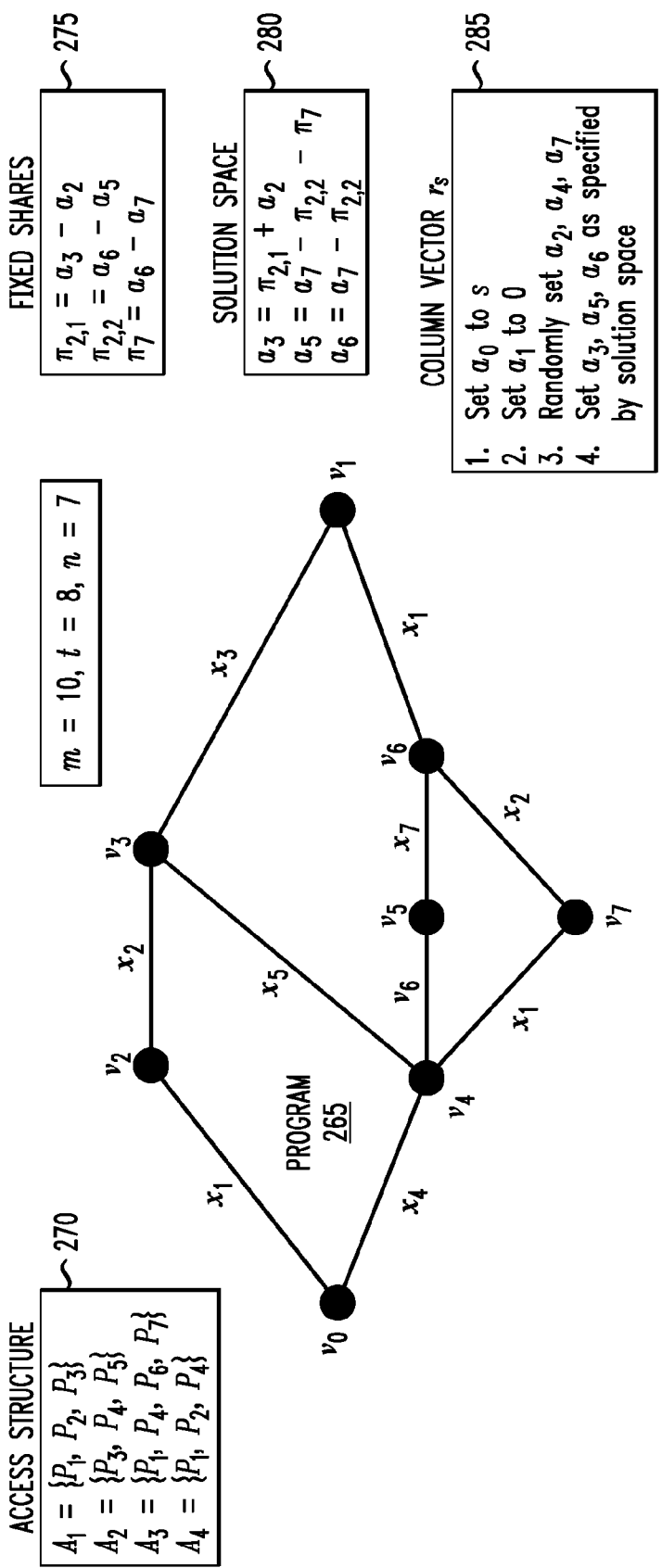
FIG. 2B illustrates an exemplary alternative implementation of a password-based linear secret sharing process as a monotone symmetric branching program specifying a concrete access structure.

FIG. 2B illustrates an exemplary instantiation of a password-based linear secret sharing process 250 as a monotone symmetric branching program specifying a concrete access structure. Consider the access structure $AS_\Pi$ for parties $P_1, \ldots, P_7$ that is defined by the program $\Pi$ shown in FIG. 2B. Here, the underlying graph consists of t=8 vertices and m=10 edges and, along with the labeling $\rho$, defines four authorized sets $A_1=\{P_1,P_2,P_3\}$, $A_2=\{P_3,P_4,P_5\}$, $A_3=\{P_1,P_4,P_6,P_7\}$ and $A_4=\{P_1,P_2,P_4\}$. Or, alternatively, it defines four sequences Q of secret reconstruction $Q_1=(P_1,P_2,P_3)$, $Q_2=(P_4,P_5,P_3)$, $Q_3=(P_4,P_6, P_7,P_1)$ and $Q_4=(P_4,P_1,P_2, P_1)$, expressed as an ordered sets of parties that need to combine (that is, by adding with alternating signs) their shares in a specific order that depends on an order induced by four in total $v_0$ -to- $v_1$ paths that exist in the graph. For a given secret s, the randomized column vector $r_s$ consists of elements $s, 0, a_2, \ldots, a_7$, where $a_i$, $2 \leq i \leq 7$, is randomly chosen. The matrix M is formed such that the shares that the parties are given are as follows. Party $P_1$ gets $S_{1,1}=a_2-a_2-s$, $S_{1,2}=a_7-a_4$ and $S_{1,3}=a_6$ as the values correspondingly assigned to edges $(v_0,v_2)$, $(v_4,v_7)$ and $(v_1,v_6)$, and similarly the other parties get the shares: $S_{2,1}=a_3-a_2$, $S_{2,2}=a_6-a_5$, $S_3=a_3$, $S_4=a_4-s$, $S_5=a_4-a_3$, $S_6=a_5-a_4$, and $S_7=a_6-a_7$. Then, to reconstruct s, authorized set $A_1$, for instance, computes the weighted sum $S_3-S_{2,1}-S_{1,1}=a_4-a_4+a_3-a_3+s=s$.

Now, assume that parties $P_2$ and $P_7$ wish to get fixed shares that take on values $\pi_{2,1},\pi_{2,2}$ and $\pi_7$ respectively. According to the password-based LSSS scheme that was described above, $3=m'\le t-2=6$ and values $a_2, \ldots, a_7$ are set so that the following $m'=3$ fixed-share conditions are satisfied: $S_{2,1}=\pi_{2,1}$, $S_{2,2}=\pi_{2,2}$ and $S_7=\pi_7$. Indeed, these three conditions define a linear system of equations consisting of the following 3 equations: $\pi_{2,1}=a_3-a_2$, $\pi_{2,2}=a_6-a_5$ and $\pi_7=a_6-a_7$. This system involves five (out of the total $t-2=6$) undetermined values, namely values $a_2,a_3,a_5,a_6$ and $a_7$. Since there are more involved variables than the available equations, the system admits a large number of solutions (essentially as large as the size of the field $\mathbb{F}$). The solution space constrains $m'=3$ of the undetermined such variables according to the conditions set by the system above in a way that is parameterized by $t-2-m'=3$ other free variables. In fact, each of the $m'=3$ constrained variables corresponds to a distinct equation of the system, thus there are generally more than one descriptions of the solution space. For instance, the solutions space can be described as the set of constraints $a_3=\pi_{2,1}+a_2$, $a_5=a_7-\pi_{2,2}-\pi_7$ and $a_6=a_7-\pi_{2,2}$, parameterized by free variables $a_2,a_4,a_7$. One such solution can be randomly selected by randomly selecting values $a_2$, $a_4$ and $a_1$ and then appropriately setting the remaining values according to the above constraints.

Therefore, after the selection of values $a_i$, $2\le i \le t$ as above, and thus the selection of the random column vector $r_s$, the dealer can compute the non-fixed shares for parties $P_1,P_3,P_4,P_5$ and $P_6$ using the same share-computation equation, that is, by giving share $(Mr_s)_j$ to party $P_{\Phi(j)}$. The dealer does not need to give the fixed shares $S_{2,1}$, $S_{2,2}$ and $S_7$ to parties $P_2$ and $P_7$, since these are respectively known to them (because they are selected by the parties and provided to the dealer prior to the secret sharing process).

The password-based linear secret sharing process 250 of FIG. 2B operates on a given monotone symmetric branching program 265 which in turn is specified by a graph consisting of $t=10$ vertices and $m=10$ edges, a labeling of the edges by $n=7$ variables (corresponding to parties). The program 265 defines access structure 270 which comprises authorized sets $A_1,A_2,A_3$ and $A_4$, each in one-to-one correspondence with the labels in the paths in the graph connecting its two special vertices $v_0$ and $v_1$. For example, $A_1=\{P_1,P_2,P_3\}$ corresponding to the top path connecting the two special vertices. Then, access structure 270 can be realized by an LSSS scheme that is defined by matrix M as specified above. To support fixed shares 275, consisting of two fixed shares for party $P_2$ and one fixed share for party $P_7$, the exemplary instantiation of a password-based linear secret sharing process 250 operates as follows. First, the system of linear equations defined by the fixed-shares conditions is solved in a parameterized manner to produce the solution space 280, where each such condition (or equation) derives a linear constraint of a distinct value of column vector $r_s$ 285, namely of values $a_3$, $a_5$ and $a_6$, that depend on the free variables $a_2$, $a_4$ and $a_7$. Therefore, the column vector 285 can be randomly set, and also consistently with the fixed-shares conditions, by first setting variable $a_0$ to secret s and variable $a_1$ to constant 0, then selecting the free variables randomly and independently of each other, and finally setting the constrained variables according to the solution space 280.

Password-Based Secret Sharing Schemes Based on Orthogonal Arrays

A threshold secret sharing scheme S with random shares is defined by a defining matrix $M=OA(q^i,n+1,q,t)$. Now, the share $s_1$ is fixed for party $P_1$ to be $\pi$. This modification means that the defining matrix does not change, but to share a secret (randomly chosen), instead of randomly selecting a row r and giving $s_i=M(r,i)$ to party $P_i$ for $i=1, \ldots, n$, a row is randomly selected from all rows r, such that $M(r,1)=\pi$. S' denotes the modified scheme.

The secret sharing scheme S' above is substantially secure.

Multiple Fixed Shares:

The defining matrix does not change, but to share a secret, instead of randomly selecting a row, the dealer randomly selects a row from all rows r such that $M(r,l_i)=\pi_{l_i}$ for all $l_i \in \{l_1, \ldots, l_m\}$ (i.e., parties with fixed shares).

FIG. 3 is a flow chart illustrating an exemplary implementation of a password-based secret sharing process 300 based on orthogonal arrays for one or more fixed shares and a randomly chosen secret. As shown in FIG. 3, the exemplary password-based secret sharing process 300 based on orthogonal arrays comprises the following steps:
1. Obtain a defining matrix M (corresponding to the randomly chosen secret) for a threshold secret sharing scheme with n parties, threshold t and a field of both the secret and the shares.
2. Obtain m fixed share(s) from parties in $P_\pi$ (where $m \ge 1$).
3. Fix share $s_i$ for party $P_i$ to be $\pi_i$ for all $l_i \in \{l_1, \ldots, l_m\}$ (i.e., parties with fixed shares).
4. Randomly select a row r in the defining matrix M from all rows such that $M(r,l_i)=\pi_{l_i}$ for all $l_i \in \{l_1, \ldots, l_m\}$ (i.e., parties with fixed shares).
5. Distribute non-fixed shares from selected row r to corresponding Parties not in $P_\pi$.

If the secret to be shared is not randomly selected and already incorporated into the defining matrix M, then step 4 above is extended so that additionally if holds that $M(r,0)=s$ where s is the secret to be shared.

RECONSTRUCTION OF SHARED SECRET IN PASSWORD-BASED SECRET SHARING SCHEMES

As defined in the sub-section entitled "Linear Secret Sharing Schemes as Generalization of Shamir's Scheme," a linear secret sharing scheme is generally a scheme such that, given a secret s coming from a domain S and some chosen randomness $r=\{r_1, \ldots, r_l\}$, where each $r_\Lambda$, $1 \le \Lambda \le l$, is an independently chosen random variable that is uniformly distributed over domain K with $S \subseteq K$: (1) a dealer produces shares $\{S_1, \ldots, S_n\}$ for parties $P_1, \ldots, P_n$, where the composite share $S_i$ of party $P_i$, $1 \le i \le n$, is of the form $S_i=(s_{i,1}, \ldots, s_{i,k_i})$; and (2) for each party $P_i$, each coordinate $s_{i,j}$ of composite share $S_i$, $1 \le j \le k_i$, is a linear combination of variables $r_1, \ldots, r_l$ and the secret s.

Beimel, referenced above, has shown that this definition is equivalent to an alternative definition that specifies a linear secret sharing scheme to be as above but with condition (2) dictating instead that: if the scheme realizes an access structure AS, then for any authorized set $A \in AS$ the reconstruction function of the secret from the shares $s_{i,j}$ jointly possessed by the parties in A is linear. That is, for every $A \in AS$ there exists constants $\{a_{i,j}:P_i \in A, 1 \le j \le k_i\}$ such that for every secret $s \in S$ and every choice of random inputs $r \in K$, it holds that $$s=\Sigma_{P_i \in A} \Sigma_{1 \le j \le k_i} a_{i,j} \cdot s_{i,j},$$

where the shares $s_{i,j}$ depend on the secret s and he randomness r and where the constants $a_{i,j}$ and the arithmetic are over the field K.

Therefore, for any linear secret sharing scheme realizing a given access structure, there exists a reconstruction method that specifies the way that the shares, jointly owned by a given authorized set, can be linearly combined to compute the shared secret. This reconstruction method remains unchanged in our password-based linear secret sharing scheme that was described above. For instance, when the disclosed password-based linear secret sharing scheme is instantiated to a password-based threshold Shamir's scheme, secret reconstruction is possible by interpolating t or more (fixed and non-fixed) shares to compute the underlying polynomial and thus recover the secret, independently on whether or how many fixed shares were used during reconstruction.

Analogously, as defined in the sub-section entitled "Defining Matrices and Orthogonal Arrays," defining matrices existentially describe all possible secret sharing and secret reconstruction possibilities in any given secret sharing scheme. Namely, any scheme is described by a defining matrix, where the sharing process is explicitly defined via random sampling, which is biased by (or conditioned on) a given secret that is to be shared, over the exhaustive list of possible sharings of all possible shared secrets. Here, the actual sharing process may be described to the dealer either in an implicit and more compact form (e.g., by randomly producing a polynomial that passes through the secret at point zero, in Shamir's scheme) or even in an explicit form, where the dealer has in its possession the entire defining matrix.

Similarly, the reconstruction process is explicitly defined via brute-force search, based on the shares jointly possessed by an authorized (or even unauthorized) set of parties, over the exhaustive list of possible sharings of all possible shared secrets. Here, again, the actual reconstruction process may be described to the parties either in an implicit and more compact form (e.g., through polynomial interpolation and evaluation of the computed polynomial at point zero, in Shamir's scheme) or even in an explicit form, where the parties perform a joint search over the entire defining matrix.

The above holds true even when the defining matrix is an orthogonal array. Therefore, no matter what the reconstruction method is, it remains unchanged in the disclosed password-based secret sharing scheme based on orthogonal arrays. For instance, when the disclosed password-based secret sharing scheme based on orthogonal arrays is instantiated to a password-based threshold Shamir's scheme, secret reconstruction is again possible by interpolating t or more (fixed and non-fixed) shares to compute the underlying polynomial and thus recover the secret, independently on whether or how many fixed shares were used during reconstruction.

Conclusion

The foregoing applications and associated embodiments should be considered as illustrative only, and numerous other embodiments can be configured using the secret sharing techniques disclosed herein, in a wide variety of different cryptography applications.

It should also be understood that the password-based secret sharing schemes, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The system may be implemented using one or more processing platforms. One or more of the processing modules or other components may therefore each run on a computer, storage device or other processing platform element. A given such element may be viewed as an example of what is more generally referred to herein as a "processing device."

Figure 4:
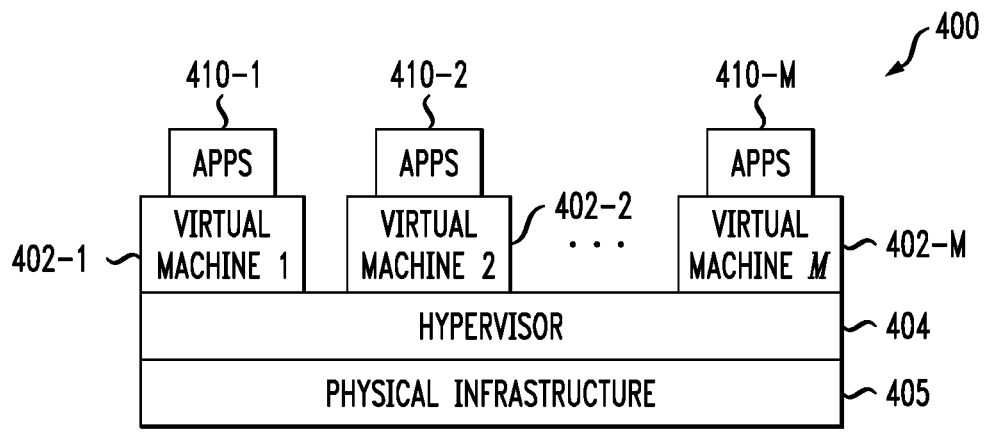
FIG. 4 illustrates an exemplary processing platform that may be used to implement at least a portion of one or more embodiments of the invention comprising a cloud infrastructure.

Referring now to FIG. 4, one possible processing platform that may be used to implement at least a portion of one or more embodiments of the invention comprises cloud infrastructure 400. The cloud infrastructure 400 in this exemplary processing platform comprises virtual machines (VMs) 402-1, 402-2, . . . 402-M implemented using a hypervisor 404. The hypervisor 404 runs on physical infrastructure 405. The cloud infrastructure 400 further comprises sets of applications 410-1, 410-2, . . . 410-M running on respective ones of the virtual machines 402-1, 402-2, . . . 402-M under the control of the hypervisor 404.

The cloud infrastructure 400 may encompass the entire given system or only portions of that given system, such as one or more of client, servers, controller, authentication server or relying server in the system.

Although only a single hypervisor 404 is shown in the embodiment of FIG. 4, the system may of course include multiple hypervisors each providing a set of virtual machines using at least one underlying physical machine.

An example of a commercially available hypervisor platform that may be used to implement hypervisor 404 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX® storage products and Symmetrix VMAX® storage products, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of one or more processing nodes, although in other embodiments a given tenant can have multiple containers. The containers may be utilized to implement a variety of different types of functionality within one or more processing nodes. For example, containers can be used to implement respective compute nodes or cloud storage nodes of a cloud computing and storage system. The compute nodes or metadata servers may be associated with respective cloud tenants of a multi-tenant environment of one or more processing nodes. Containers may be used in combination with other virtualization infrastructure such as virtual machines implemented using a hypervisor.

Figure 5:
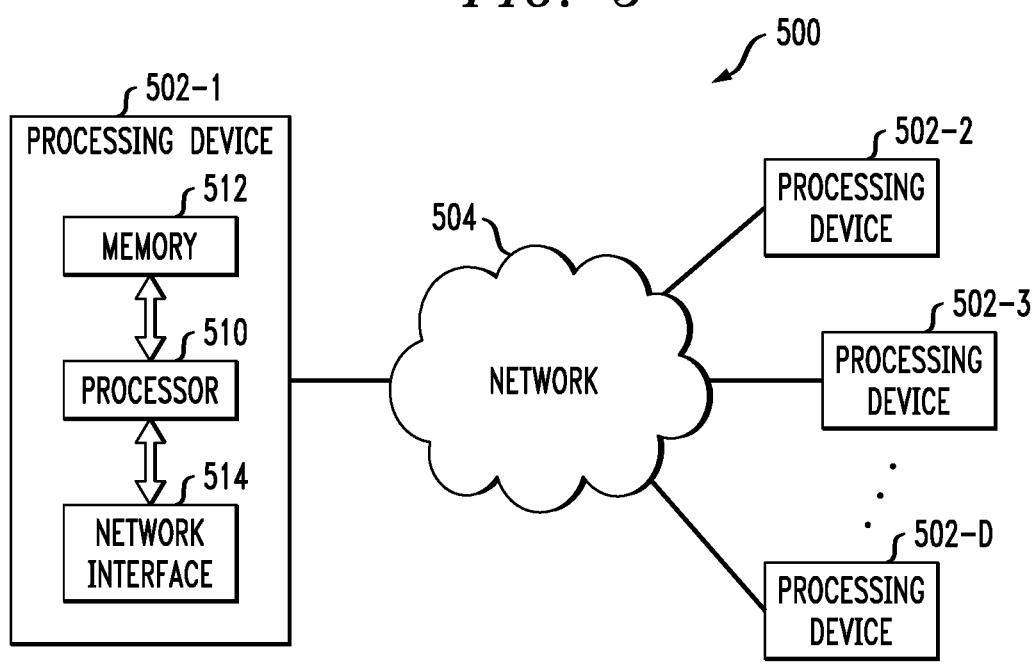
FIG. 5 illustrates another exemplary processing platform that may be used to implement at least a portion of one or more embodiments of the invention.

Another example of a processing platform is processing platform 500 shown in FIG. 5. The processing platform 500 in this embodiment comprises at least a portion of the given system and includes a plurality of processing devices, denoted 502-1, 502-2, 502-3, . . . 502-D, which communicate with one another over a network 504. The network 504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512. The processor 510 may comprise a microprocessor, a microcontroller, an application specific integrated circuit (ASIC), a field programmable gate array (FPGA) or other type of processing circuitry, as well as portions or combinations of such circuitry elements, and the memory 512, which may be viewed as an example of a "computer program product" having executable computer program code embodied therein, may comprise random access memory (RAM), read only memory (ROM) or other types of memory, in any combination.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 4 or 5, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from the password-based secret sharing schemes as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A secret sharing method for the protection of at least one data item, comprising:
   obtaining a secret, wherein said secret protects said at least one data item;
   obtaining m fixed values from one or more parties, where m is greater than or equal to one;
   setting, using at least one processing device, a first element of a column vector of a password-based linear secret sharing scheme having a size t to a value that depends on said secret;
   randomly selecting, using said at least one processing device, values from a field for t−m−1 additional elements of said column vector;
   setting, using said at least one processing device, remaining elements of said column vector to values that ensure that a product of an m-by-t matrix and said column vector, for each of said one or more parties, is equal to the fixed value of said corresponding party; and
   distributing, using said at least one processing device, non-fixed shares based on said product to at least one device of additional parties during a secret sharing phase using a labeling function, such that said secret is reconstructed during a secret reconstruction phase only when a predefined minimum number of said secret shares are provided to one or more authentication servers.

2. The method of claim 1, wherein said fixed values comprise a result of a hash function applied to a password of said one or more parties.

3. The method of claim 1, wherein said fixed value comprises one or more of secret information related to said one or more parties and a password of said one or more parties.

4. The method of claim 1, wherein said secret protects at least one data item.

5. The method of claim 1, wherein t shares comprise a minimal authorized set needed for reconstruction of said secret and wherein said t shares must be obtained in a predefined order to reconstruct said secret.

6. The method of claim 1, wherein a reconstruction of said secret is based on an access structure comprising one or more authorized sets of parties, wherein said authorized sets of parties comprise an ordered set of parties that need to combine shares in a predefined order to reconstruct said secret.

7. A non-transitory machine-readable recordable storage medium having encoded therein executable code of one or more software programs for the protection of at least one data item, wherein the one or more software programs when executed by one or more processing devices implement the following steps:

obtaining a secret, wherein said secret protects said at least one data item;

obtaining m fixed values from one or more parties, where m is greater than or equal to one;

setting, using at least one processing device, a first element of a column vector of a password-based linear secret sharing scheme having a size t to a value that depends on said secret;

randomly selecting, using said at least one processing device, values from a field for t−m−1 additional elements of said column vector;

setting, using said at least one processing device, remaining elements of said column vector to values that ensure that a product of an m-by-t matrix and said column vector, for each of said one or more parties, is equal to the fixed value of said corresponding party; and distributing, using said at least one processing device, non-fixed shares based on said product to at least one device of additional parties during a secret sharing phase using a labeling function, such that said secret is reconstructed during a secret reconstruction phase only when a predefined minimum number of said secret shares are provided to one or more authentication servers.

8. An apparatus for the protection of at least one data item, comprising:

a memory; and at least one hardware device, coupled to the memory, operative to implement the following steps:

obtaining a secret, wherein said secret protects said at least one data item;

obtaining m fixed values from one or more parties, where m is greater than or equal to one;

setting, using at least one processing device, a first element of a column vector of a password-based linear secret sharing scheme having a size t to a value that depends on said secret;

randomly selecting, using said at least one processing device, values from a field for t−m−1 additional elements of said column vector;

setting, using said at least one processing device, remaining elements of said column vector to values that ensure that a product of an m-by-t matrix and said column vector, for each of said one or more parties, is equal to the fixed value of said corresponding party; and distributing, using said at least one processing device, non-fixed shares based on said product to at least one device of additional parties during a secret sharing phase using a labeling function, such that said secret is reconstructed during a secret reconstruction phase only when a predefined minimum number of said secret shares are provided to one or more authentication servers.

9. The apparatus of claim 8, wherein said fixed values comprise one or more of secret information related to said one or more parties, a password of said one or more parties, and a result of a hash function applied to a password of said one or more parties.

10. A secret sharing method for the protection of at least one data item, comprising:

obtaining a secret, wherein said secret protects said at least one data item;

obtaining at least one fixed value from one or more parties in a set of parties;

obtaining a defining matrix corresponding to said secret for a threshold secret sharing scheme with a threshold and a field of both the secret and a plurality of shares of the secret;

setting, using at least one processing device, a given share for each party in said set of parties to said corresponding obtained fixed value for all parties in said set of parties;

randomly selecting, using said at least one processing device, a row in said defining matrix from all rows of said defining matrix such that an element in said row corresponding to each of said one or more parties in said set of parties is equal to said corresponding obtained fixed value; and distributing, using at least one processing device, non-fixed shares from the elements of the selected row to at least one device of corresponding parties not in said set of parties during a secret sharing phase, such that said secret is reconstructed during a secret reconstruction phase only when a predefined minimum number of said secret shares are provided to one or more authentication servers.

11. The method of claim 10, wherein said random row selection further requires that an element in said row corresponding to said secret is equal to said secret.

12. The method of claim 10, wherein said fixed values comprise a result of a hash function applied to a password of said one or more parties.

13. The method of claim 10, wherein said fixed value comprises one or more of secret information related to said one or more parties and a password of said one or more parties.

14. The method of claim 10, wherein said secret protects at least one data item.

15. The method of claim 10, wherein t shares comprise a minimal authorized set needed for reconstruction of said secret and wherein said t shares must be obtained in a predefined order to reconstruct said secret.

16. A non-transitory machine-readable recordable storage medium having encoded therein executable code of one or more software programs for the protection of at least one data item, wherein the one or more software programs when executed by one or more processing devices implement the following steps:

obtaining a secret, wherein said secret protects said at least one data item;

obtaining at least one fixed value from one or more parties in a set of parties;

obtaining a defining matrix corresponding to said secret for a threshold secret sharing scheme with a threshold and a field of both the secret and a plurality of shares of the secret;

setting, using at least one processing device, a given share for each party in said set of parties to said corresponding obtained fixed value for all parties in said set of parties;

randomly selecting, using said at least one processing device, a row in said defining matrix from all rows of said defining matrix such that an element in said row corresponding to each of said one or more parties in said set of parties is equal to said corresponding obtained fixed value; and distributing, using at least one processing device, non-fixed shares from the elements of the selected row to at least one device of corresponding parties not in said set of parties during a secret sharing phase, such that said secret is reconstructed during a secret reconstruction phase only when a predefined minimum number of said secret shares are provided to one or more authentication servers.

17. An apparatus for the protection of at least one data item, comprising:
a memory; and
at least one hardware device, coupled to the memory, operative to implement the following steps:
obtaining a secret, wherein said secret protects said at least one data item;
obtaining at least one fixed value from one or more parties in a set of parties;
obtaining a defining matrix corresponding to said secret for a threshold secret sharing scheme with a threshold and a field of both the secret and a plurality of shares of the secret;
setting, using at least one processing device, a given share for each party in said set of parties to said corresponding obtained fixed value for all parties in said set of parties;
randomly selecting, using said at least one processing device, a row in said defining matrix from all rows of said defining matrix such that an element in said row corresponding to each of said one or more parties in said set of parties is equal to said corresponding obtained fixed value; and
distributing, using said at least one processing device, non-fixed shares from the elements of the selected row to at least one device of corresponding parties not in said set of parties during a secret sharing phase, such that said secret is reconstructed during a secret reconstruction phase only when a predefined minimum number of said secret shares are provided to one or more authentication servers.

18. The apparatus of claim 17, wherein said random row selection further requires that an element in said row corresponding to said secret is equal to said secret.

19. The apparatus of claim 17, wherein said fixed values comprise one or more of secret information related to said one or more parties, a password of said one or more parties, and a result of a hash function applied to a password of said one or more parties.

20. The apparatus of claim 17, wherein t shares comprise a minimal authorized set needed for reconstruction of said secret and wherein said t shares must be obtained in a predefined order to reconstruct said secret.

* * * * *